United States Patent [19]

Lord et al.

[11] 4,256,584

[45] Mar. 17, 1981

[54] INJECTION MOLDING FILTER ASSEMBLY

[75] Inventors: John Lord, Georgetown; Jobst U. Gellert, Glen Williams, both of Canada

[73] Assignee: Mold-Masters Limited, Georgetown, Canada

[21] Appl. No.: 60,827

[22] Filed: Jul. 25, 1979

[30] Foreign Application Priority Data

Jul. 20, 1979 [CA] Canada .................................. 332292

[51] Int. Cl.³ .............................................. B01D 35/02
[52] U.S. Cl. ........................... 210/446; 210/DIG. 15; 425/568
[58] Field of Search ............... 210/446, DIG. 15, 488, 210/409, 497 R; 425/199, 568

[56] References Cited

U.S. PATENT DOCUMENTS

| | | | |
|---|---|---|---|
| 1,335,899 | 4/1920 | Hehlenbey | 210/446 |
| 1,802,423 | 4/1931 | Hemmingsen | 210/446 |
| 3,767,056 | 10/1973 | Neumen | 210/446 |
| 3,825,123 | 7/1974 | Neumen | 210/DIG. 15 |
| 3,935,972 | 2/1976 | Tsunemoto et al. | 425/568 |
| 3,952,927 | 4/1976 | Schaumberger et al. | 425/568 |
| 4,046,359 | 9/1977 | Gellert | 210/488 |
| 4,069,003 | 1/1978 | Cecchi | 425/568 |
| 4,097,216 | 6/1978 | Putonski | 425/568 |

*Primary Examiner*—Theodore A. Granger

*Attorney, Agent, or Firm*—George H. Riches and Associates

[57] ABSTRACT

This invention relates to an improved injection molding filter assembly to be located between the molding machine and the mold. The assembly has an elongated inner torpedo member with a generally cylindrical outer surface which is centrally located in a passage through a hollow outer member. The passage is defined by a generally cylindrical inner wall which is interrupted by an even number of inwardly opening longitudinally extending channels. Inlet channels extending from the inlet of the assembly and dead ending adjacent the outlet alternate with outlet channels extending from the outlet of the assembly and dead ending adjacent the inlet. Uniform width elongated filtering slits are thus formed between the outer surface of the torpedo member and the lands between the inlet and outlet channels. The melt flows into the inlet channels, through the adjacent filtering slits, and out the outlet channels. Contaminants which are too large to pass through the filtering slits accumulate adjacent the dead ends of the inlet channels. The outer member has a collar portion which may be detached to take out the torpedo member for periodic removal of accumulated contaminants. The location of the channels in the outer member provides improved heat flow characteristics and allows the width of the filtering slits to be quickly and easily changed by substituting a relatively inexpensive torpedo member having a different diameter.

5 Claims, 6 Drawing Figures

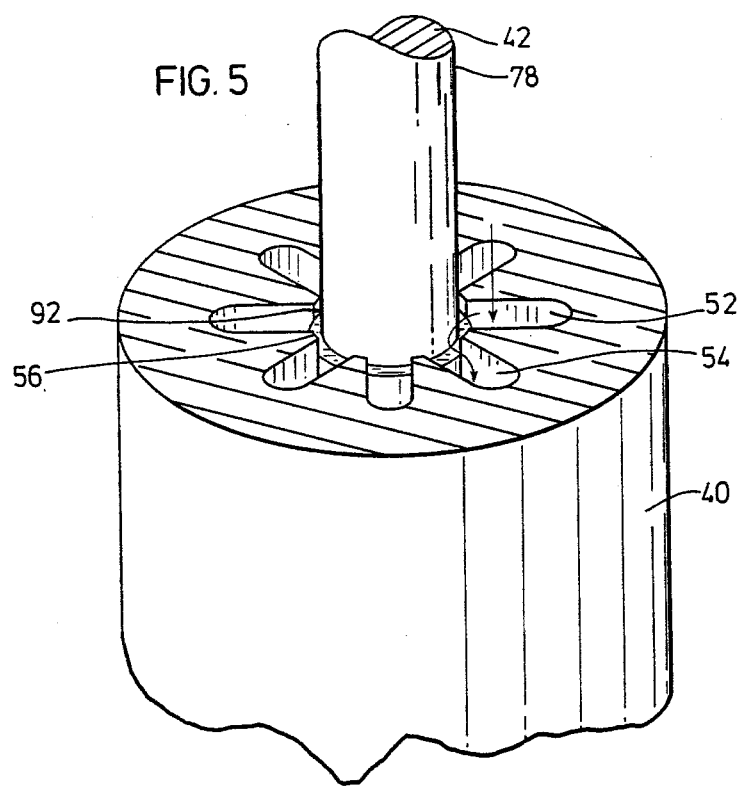
FIG. 5
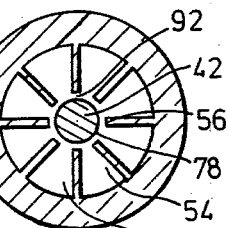
FIG. 6
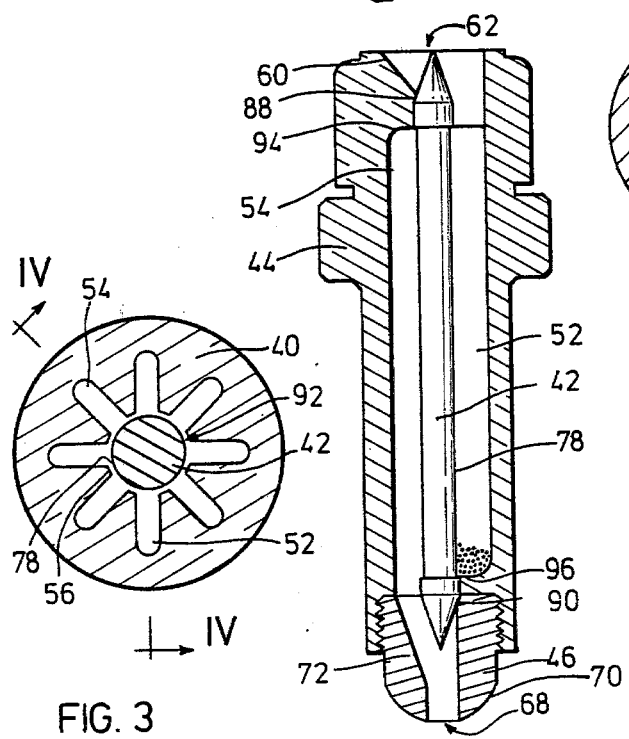
FIG. 3
FIG. 4

INJECTION MOLDING FILTER ASSEMBLY

BACKGROUND OF THE INVENTION

This invention relates generally to injection molding and more particularly to an improved filter assembly through which hot molten plastic material passes from the molding machine to the manifold or mold.

The hot molten plastic material or melt may contain contaminants such as wood, paper, cardboard, iron, string steel or brass which may plug the gates or interfere with operation of the valve pins, thus resulting in costly loss of production. Consequently, it is highly desirable to be able to filter the melt as it leaves the molding machine. In the past, various devices have been used for this purpose. Thin mesh screens located in front of orficed retaining plates have the disadvantage that the screen may break down and itself become a contaminant. Other devices such as radial filters have a considerable number of parts and accordingly are costly to manufacture and replace. Others have been provided with purging mechanisms, but these similarly have the disadvantage of being relatively costly and are subject to malfunction. The applicant's previous U.S. Pat. No. 4,046,359 dated Sept. 6. 1977 discloses an injection molding filter assembly which deals with these problems and while it makes substantial improvements, there are still disadvantages remaining.

A very considerable concern is to be able to pass a large volume of melt through the filter in a short period of time when injection is occurring. This is difficult in view of the restricted size of openings required in order to filter the contaminants from the melt. This problem is dealt with in U.S. Pat. No. 4,097,216 to Putkowski dated June 27, 1978 by elongating the filtering openings between the cylindrical outer body member and a fluted inner torpedo member. While also providing substantial improvements, this filter assembly similarly has ramaining disadvantages.

A major concern in injection molding is even control of the melt temperature. A drop in temperature in some areas may result in uneven flow and increasing overall temperatures to compensate for this may lead to break down of the melt. In the present case, it is important that there be no drop in melt temperature in the flow areas furthest removed from the filtering openings or undesirable dead spots may occur. This is particularly important in the slots or channels where the filtered contaminants build up. Depending upon the size of the filtering areas or slits, the size of the slots or channels may be very important in permitting sufficient melt flow without undesirable pressure drop. Another disadvantage of the previous filter assembly is that the size of the filtering area or slit cannot be changed by simply replacing a relatively inexpensive inner torpedo member by one of a different size. In order to filter different materials for different application, it is necessary that it be possible to change to a number of different filtering sizes and thus the cost of stocking the different torpedo members becomes an important factor.

Other practical difficulties in this art are the avoidance of dead spots at the inlet and outlet and accurate location of the torpedo member.

SUMMARY OF THE INVENTION

Accordingly, it is an object of the present invention to at least partially overcome these disadvantages by providing an improved injection molding filter assembly providing longitudinal filtering slits between a fluted outer member and a generally cylindrical inner torpedo member.

To this end, in one of its aspects, this invention provides an improved injection molding filter assembly to filter pressurized melt flowing therethrough comprising an elongated hollow outer member having a central longitudinal axis, a first end and a second end, the first end having an inlet opening and the second end having an outlet opening, the outer member having a fluted inner surface defining an even number of inwardly opening longitudinally extending channels with narrow elongated lands therebetween, the lands all being located an equal distance from the central axis along their length, alternate ones of the channels extending from the inlet opening to first blind ends towards the second end of the outer member, the other intervening channels extending from the outlet opening to second blind ends towards the first end of the outer member, and an elongated inner torpedo member centrally located in the outer member, having a generally cylindrical outer surface which is smaller in diameter by a predetermined amount than the said distance of the lands from the said central axis to form a number of elongated filtering slits between the outer surface of the inner member and said lands through which the melt flows from the inlet channels to the outlet channels, the inner torpedo member being longitudinally secured to have the cylindrical outer surface extend at least between the first and second blind ends, impurities too large to pass through the filtering slits being accumulated at the blind ends of the inlet channels.

Further objects and advantages of the invention will appear from the description taken together with the accompanying drawings.

BRIEF DESCRIPTION OF THE DRAWINGS

FIG. 3 is a cross sectional view of the filter assembly seen in FIG. 2;

FIG. 4 is a longitudinal section of the filter assembly taken along line IV—IV in FIG. 3;

FIG. 5 is a perspective view of a central portion of the filter assembly seen in FIG. 2 broken out to show the direction of flow of the melt;

FIG. 6 is a cross sectional view similar to FIG. 3, showing a filter assembly having a configuration according to an alternate embodiment of the invention.

DESCRIPTION OF THE PREFERRED EMBODIMENTS

Figure 1:
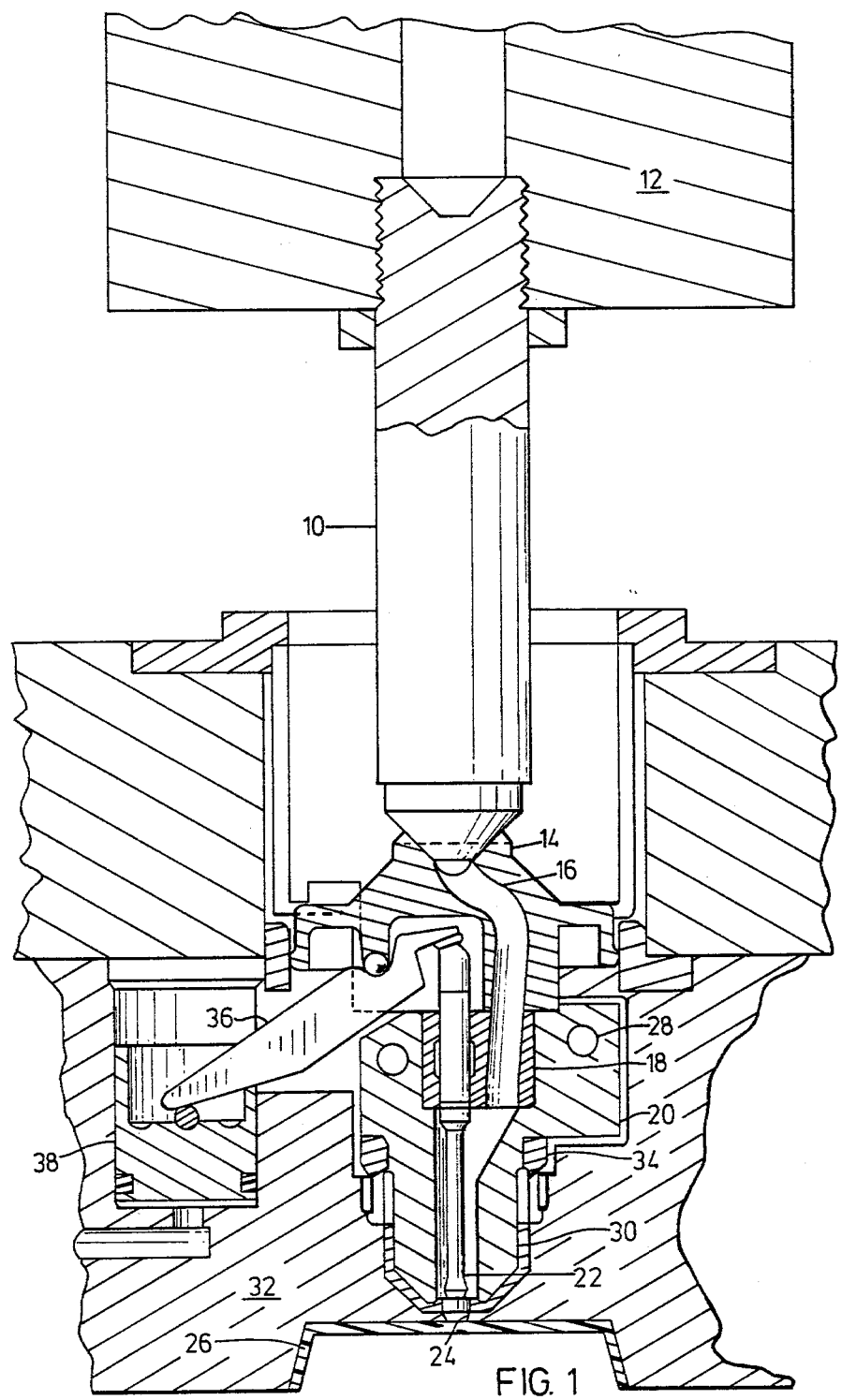
FIG. 1 is a partial sectional view of the valve gated injection molding system utilizing an improved filter assembly according to the invention.

Reference is first made to FIG. 1 which shows a valve gating injection molding system having a filter assembly 10 located between the molding machine 12 and the back plate 14. The hot runner passage 16 extends from the filter assembly 10, through the back plate 14, through the bushing seal 18 received in the heater cast 20, around the stem of the valve pin 22, through the gate 24 and into the cavity 26. The heater cast 20 is formed of beryllium copper and has an electrical heating element 28 and a nozzle portion 30. The heater cast 20 is positioned in the cavity plate 32 by insulation bushing 34. The valve pin 22 is actuated by rocker arm 36 which is driven by piston 38.

Figures 2, 7:
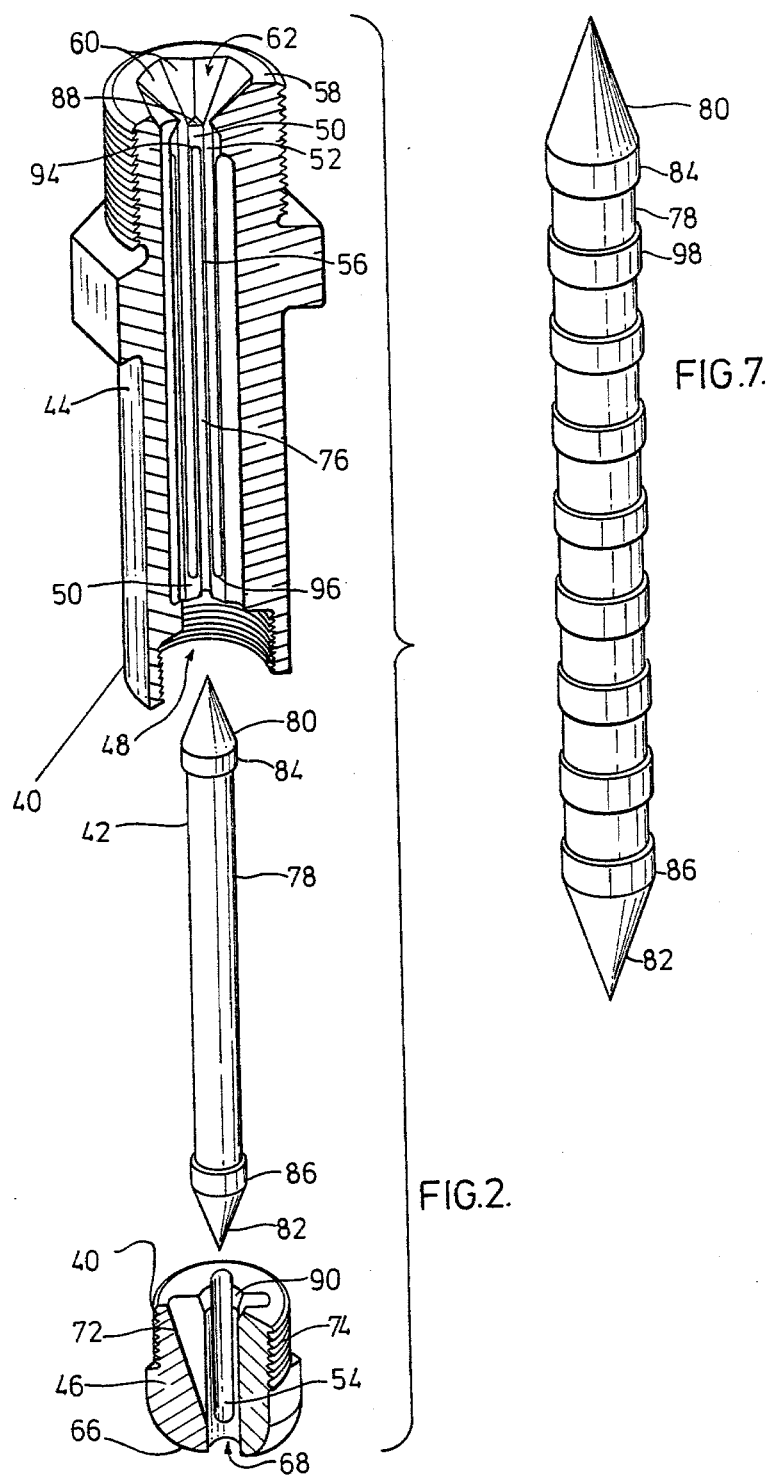
FIG. 2 is an exploded partially broken away perspective view of a filter assembly according to a first embodiment of the invention.
FIG. 7 (located on page with FIG. 2) is a perspective view of an inner torpedo member according to a further embodiment of the invention.

Reference is now made to FIG. 2 which shows a filter assembly 10 having an elongated hollow outer member 40 and an elongated inner torpedo member 42. The hollow outer member 40 has a body portion 44 and a removable torpedo retaining collar portion 46. The outer member 40 has a central passage 48 therethrough defined by generally cylindrical inner surface 50 from which are recessed an even number of radially spaced inwardly opening longitudinally extending channels; alternately, inlet channels 52 and outlet channels 54. The inlet channels 52 and outlet channels 54 extend generally parallel to each other and define therebetween narrow elongated lands 56 of inner surface 50. The outer member 40 has an inlet end 58 with sloping surfaces 60 defining an inlet opening 62. The inlet end 58 of the outer member 40 is threaded to securely connect it to the molding machine 12. An outlet end 66 of the outer member 40 is provided by the retaining collar portion 46 which defines an outlet opening 68 therethrough. The curved outer face 70 is shaped to be securely received in the back plate 14.

As may be seen, the inlet channels 52 extend from the inlet opening 62, but stop short of the outlet opening 68. On the other hand, the outlet channels 54 have a sloping portion 72 extending from the outlet opening 68 in the collar portion 46 of the outer member 40. The collar portion 46 is removably secured to the body portion 44 by threads 74 which are dimensioned so that the sloping 72 of the outlet channels 54 line up respectively with the remaining portions 76 of the outlet channels 54, which stop short of the inlet opening 62.

The inner torpedo member 42 has a generally cylindrical outer surface 78 which is smaller in diameter than cylindrical inner surface 50 of the outer member 40 by a predetermined amount. The torpedo member 42 has first and second conical ends 80, 82 which, in this embodiment, extend from raised cylindrical centering portions 84, 86 of the surface of the torpedo member 42. Upon assembly of the torpedo member 42 in the hollow outer member 40, the torpedo member 42 is restricted against axial movement by the abutment of the first conical end 80 on the conical surfaces 88 extending from the inner surface 50 of the body portion 44 of the outer member 40, and by the abutment of second conical end 82 on conical surfaces 90 of the retaining collar portion 46. The raised cylindrical portions 84, 86 of the surface of the torpedo member 42 abut on the cylindrical inner surface 50 to ensure that the torpedo member 42 is centrally located in the passage 48 to thereby form elongated filtering slits 92 having a uniform width between the outer surface 78 of the inner torpedo member 42 and the lands 56 of the outer member 40. In order to ensure that all of the melt passing through the assembly is filtered, the inner torpedo member must be located so that the cylindrical outer surface 78 (including raised portions 84, 86) extends at least from the dead ends 94 of the outlet channels 54 to the dead ends 96 of the inlet channels 52. All components are made of H13 steel, although other materials having sufficient strength, durability, and suitable heat transfer characteristics may also be used.

In use, the body portion 44 of the outer member 40 is screwed into the molding machine 12 and the torpedo member is inserted into it. The retaining collar portion 46 is then screwed on and a predetermined torque is applied to ensure that the sloping portions 72 of the outlet channels 54 are in alignment with the respective remaining portions, at which time the conical ends 80, 82 of the torpedo member 42 are abutting respectively on the conical surfaces 88, 90. The filter assembly 10 is then positioned against the back plate 14 and molding begins. The pressurized melt from the molding machine 12 is directed by sloping surfaces 60 to flow smoothly into inlet channels 52. As best seen in FIGS. 3 and 5, the melt cannot pass through the inlet channels 52 due to dead ends 96 and therefore it flows circumferentially around the outer surface 78 of the torpedo member 42 through the filtering slits 92 and into the adjacent outlet channels 54. The contaminants which are too large to pass through the filtering slits 92 are carried along the inlet channels 52 and accumulate adjacent the dead ends 96. The filtered melt flows smoothly from the outlet channels 54 through the outlet opening 68 into the hot runner passage 16.

The large cross sectional area of the filtering slits 92 ensures that there is a relatively low pressure drop through the filter assembly even when the inlet channels 52 become partially filled with accumulated contaminants. The total cross sectional area of the inlet channels 52 and the outlet channels 54 may be increased by increasing the diameter of the outer member 40 and the total area of the filtering slits may accordingly be increased by increasing the length of the filter assembly. Furthermore, the inlet and outlet structure of the filter assembly provides for smooth flow of the melt through the assembly and avoids dead spots.

After an extended period of use, the accumulated contaminants may be quickly and easily removed by unscrewing the retaining collar portion 46 of the outer member 40 and taking out the inner torpedo member 42. If a different application or type of molding material indicates that a different dimension of filtering slit is required, the inner torpedo member 42 may be replaced from stock by a torpedo member having the appropriate diameter. Uniform melt temperature is maintained by the large surface area of the outer member 40 in contact with the melt. If necessary, additional heating may be supplied by heating elements in or around walls of the outer member 40.

The filter assembly 10 seen in FIG. 6 is similar in most repects to the embodiment described above and features common to both embodiments are described and illustrated using the same reference numerals. However, as may be seen, the inlet and outlet channels 52, 54 have been substantially increased in cross sectional area. Thus, an increase in the area of the filtering slits 92 between the inner torpedo member 42 and the outer member 40 by lengthening the filter assembly may be accommodated without increasing the pressure drop.

FIG. 7 illustrates an alternate embodiment of inner torpedo members 42. In this embodiment, the generally cylindrical outer surface 78 is interrupted by a larger number of raised centering portions 98. When assembled, these raised centering portions 98 abut on the cylindrical inner surface 50 of the outer member 40 to ensure that the inner torpedo member 42 is properly located throughout its length. This avoids any changes in the dimensions of the filtering slits 92 due to sideways flexing of the inner torpedo member 42 under the pressure of the melt.

Although the description of this invention has been given with respect to these particular embodiments, it is not to be construed in a limiting sense. Many variations and modifications will now occur to those skilled in the art. For instance, dfferent numbers of inlet and outlet channels could be used with satisfactory results. For a definition of the invention reference is made to the appended claims.

What I claim is:

1. An improved injection molding filter assembly to filter pressurized melt flowing therethrough comprising:
    (a) an elongated hollow outer member having a central longitudinal axis, a first end and a second end, the first end having an inlet opening and the second end having an outlet opening, the outer member having a fluted inner surface defining an even number of inwardly opening longitudinally extending channels with narrow elongated lands therebetween, the lands all being located an equal distance from the central axis along their length, alternate ones of the channels extending from the inlet opening to first blind ends towards the second end of the outer member, the other intervening channels extending from the outlet opening to second blind ends towards the first end of the outer member, and
    (b) an elongated inner torpedo member centrally located in the outer member, having a generally cylindrical outer surface which is smaller in diameter by a predetermined amount than the said distance of the lands from the said central axis to form a number of elongated filtering slits between the outer surface of the inner member and said lands through which the melt flows from the inlet channels to the outlet channels, the inner torpedo member being longitudinally secured to have the cylindrical outer surface extend at least between the first and second blind ends, impurities too large to pass through the filtering slits being accumulated at the blind ends of the inlet channels.

2. A filter assembly as claimed in claim 1 wherein the inner torpedo member has first and second end surfaces which abut respectively against retaining surfaces at the first and second ends of the outer member to longitudinally secure the inner member in the outer member.

3. A filter assembly as claimed in claim 2 wherein the end surfaces of the inner torpedo member are conical shaped.

4. A filter assembly as claimed in claim 2 wherein the outer member has a body portion and a retaining collar portion removably attached to the body portion, the collar portion defining the outlet opening at the second end of the outer member and having the retaining surfaces which abut against the second end surface of the inner torpedo member, whereby the inner torpedo member may be easily removed for cleaning by removing the retaining collar portion of the outer member.

5. A filter assembly as claimed in claim 1, 2 or 3 wherein the outer surface of the inner torpedo member has longitudinally spaced raised portions which abut on the lands between the channels to securely centrally locate the inner torpedo member in the outer member.

* * * * *